United States Patent [19]
Newell

[11] 3,961,232
[45] June 1, 1976

[54] HYBRID STEP MOTOR SYSTEM

[75] Inventor: Harold R. Newell, S. Newbury, N.H.

[73] Assignee: Mesur-Matic Electronics Corporation, Salem, Mass.

[22] Filed: Apr. 30, 1974

[21] Appl. No.: 465,596

[52] U.S. Cl.................................. 318/46; 318/685; 318/696
[51] Int. Cl.² ........................................ H02P 5/46
[58] Field of Search .......... 318/696, 685, 254, 138, 318/231, 45, 46

[56] References Cited
UNITED STATES PATENTS

| | | | |
|---|---|---|---|
| 2,896,143 | 7/1959 | Bekey | 318/231 UX |
| 3,268,785 | 8/1966 | Gerber et al. | 318/685 |
| 3,375,422 | 3/1968 | Boudiques | 318/254 |
| 3,404,323 | 10/1968 | Gifford | 318/696 |
| 3,453,510 | 7/1969 | Kreufer et al. | 318/696 |

Primary Examiner—Gene Z. Rubinson
Attorney, Agent, or Firm—Pollock, Vande Sande & Priddy

[57] ABSTRACT

A hybrid step motor system, in which a first step motor which steps A degrees per step and is provided with a load output shaft, has its stator driven by a second step motor which steps A/10° per step, so that the system has a resolution of A/10°, when the motors are cascaded, but attains a given angular setting substantially in the time required by the first step motor to attain that setting.

15 Claims, 4 Drawing Figures

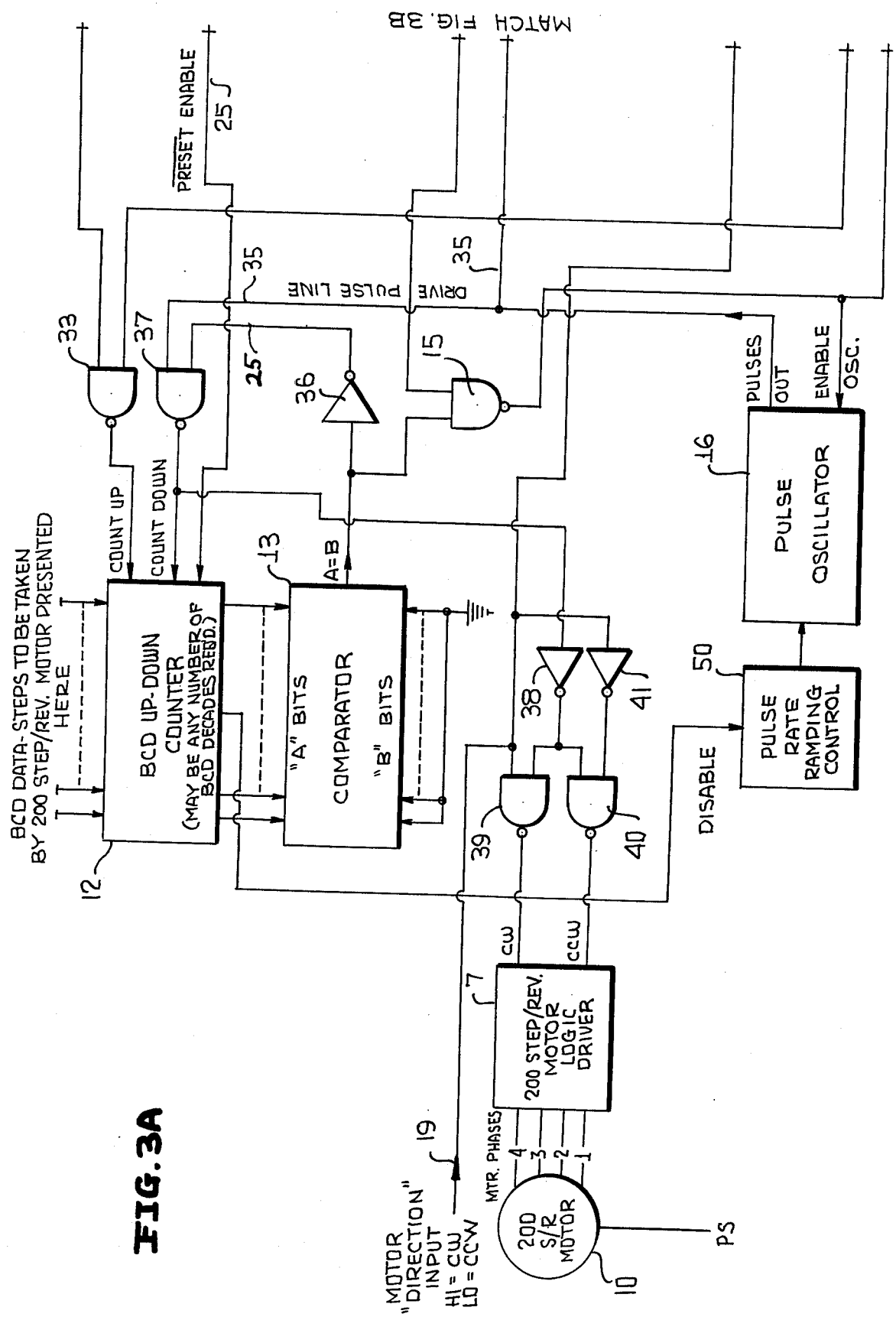

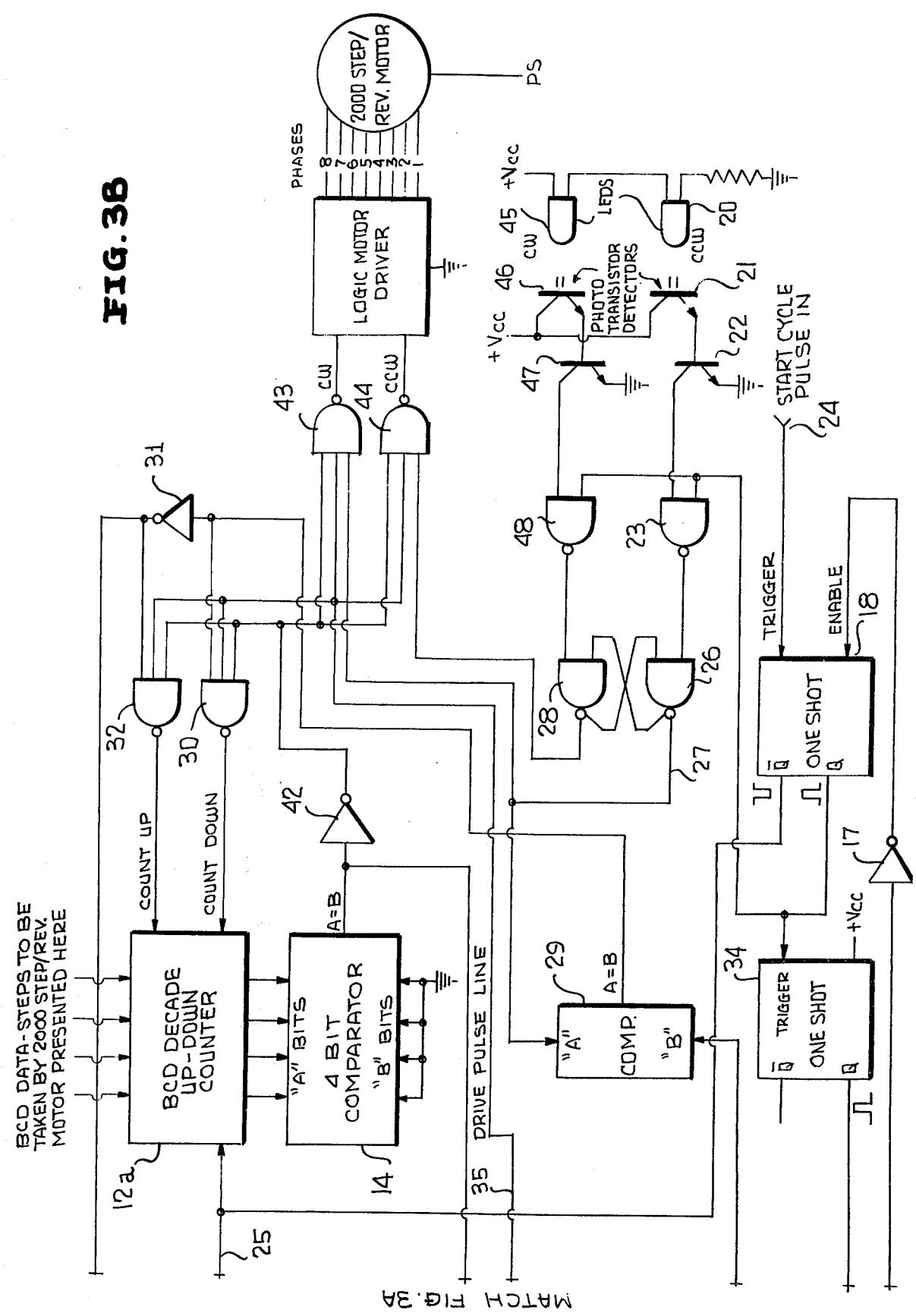

HYBRID STEP MOTOR SYSTEM

BACKGROUND OF THE INVENTION

The permanent magnet type of stepping motor, with typically 200 steps per revolution, when used to drive a five-thread-per-inch lead screw on a machine tool, such as a milling machine, provides 0.001 inch deflection per motor step.

When finer resolution such as 0.0001 inch per step is required, (1) the pitch of the lead screw must be changed, or (2) gearing must be used between the motor and lead screw, or (3) a motor with finer steps must be used. All of these means reduce the maximum machine axis motion rate of the system by a factor of 10.

In the present system, a first 200 step/rev. type motor is used to drive the lead screw and a second cascaded motor, giving 2000 steps/rev., is used to rotate the first motor's housing. Through electronic circuitry, the 200 step/rev. motor takes all the full 1.8° steps while the 2000 step/rev. motor makes up the remainder of the motion in 0.18° increments. Thus, the motor system can be described as having 10 times the positioning resolution and 10 times the stepping rate of the 200 step/rev. motor alone while machine axis motion rate does not decrease. The second stepper is uniquely qualified to operate in the present system. It can easily provide steps as small as 0.18° with exceptional drive stiffness (expressed in degrees of rotation per inch lb. of torque when backdriven). It has exceptional ability to handle the large inertia represented by the 200 step/rev. motor housing, both because of its large output torque and its drive stiffness.

The present system is particularly suitable where there is very little offsetting load once final position has been reached. If there is an offsetting load, there will be a degradation of positioning accuracy as the axis is driven through the 200 step/rev. motor, whose stiffness is less than 1/10 as great as that of the second motor.

A system in which there is little or no offsetting torque when the desired position is reached is one in which the load is pure inertia or where the hybrid system is used to drive a servo valve and dydraulic amplifier which in turn drives the machine axis.

In the present system, the second 2000 step/rev. motor mounts on a cylindrical coupling frame. The rear of the 200 step-rev. motor mounts on the second motor shaft via a motor shaft coupler. The front of the 200 step/rev. motor mounts on a coupling frame via a shaft bearing. The front of the coupling has a centering pilot and mounting holes. The 200 step/rev. motor drives the load. Assume that it is desired that the shaft rotate 180.72°. This corresponds to 100 steps of the 200 step/rev. motor plus four steps of the 2000 step/rev. motor. The desired step count 1004 is shifted into electronic logic by which the tens count and higher, goes into a 200 step/rev. motor register and the units count into a 200 step/rev. motor register and the units count into a 2000 step/rev. motor register.

On the "go" signal, an oscillator feeds pulses to the 200 step/rev. motor driver and register, downcounting it, and also to the 2000 step/rev. motor driver and register, downcounting both simultaneously.

If it is desired to operate the 200 step/rev. motor faster than its start-stop asynchronous rate, (the rate at which the motor will start or stop without missing steps) the oscillator starts at a low rate and increases its rate according to an acceleration program. The rate starts to decrease when the count in the 200 step/rev. register has decreased to a predetermined amount so that the rate will be low enough to allow proper stepping of the 200 step/rev. motor when the register reaches zero. Since only a maximum of nine counts will at any time be in the 2000 step/rev. register, the associated motor can always be taken at the low rate. As they are stepped simultaneously with the 200 step/rev. motor, no additional operating time is caused by the added motor.

In the preferred embodiment of the invention, unidirectional position correction of the 200 step/rev. motor by the 2000 step/rev. motor is not possible. In other words, if the 2000 step/rev. motor were always to rotate in one direction, the limit of travel of the 200 step/rev. motor housing would be reached. Therefore, there are two rotational limit detectors on the 200 step/rev. motor housing. When a limit of rotation of the 200 step/rev. motor is reached as imposed by either of the limit detectors, the 2000 step/rev. motor corrects in the other direction. For instance, assume a desired motion of 180.72°. Normally, as previously described, 100 steps of the 200 step/rev. motor and four steps of the 2000 step/rev. motor in the same direction for both motors will accomplish this. However, if the 200 step/rev. motor housing has rotated by the 2000 step/rev. motor to a predetermined position so as to reach a "stop" as imposed by one of the limit detectors, the limit detector causes the logic to put one more step in the 200 step/rev. count, overshooting by 1.8° count, and the 2000 step/rev. motor is caused to operate in the opposite direction for six counts to arrive at the same position.

The system operates in this manner when either limit is reached.

SUMMARY OF THE INVENTION

According to the invention a step motor system is provided in which two step motors, having respectively coarse and fine angular steps, are driven in cascade one from the other, to provide a final setting determined by the fine step motor but accomplished in a time established by the coarse motor.

DESCRIPTION OF THE DRAWINGS

FIGS. 3A and 3B are a logic circuit diagram for controlling the final angular position of the hybrid motor system of FIG. 1.

DETAILED DESCRIPTION OF A PREFERRED EMBODIMENT

Figure 1:
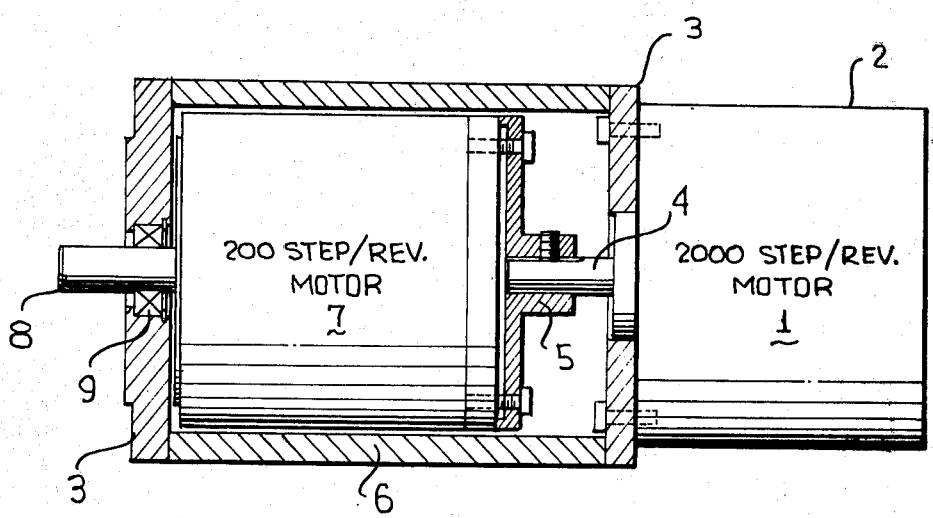
FIG. 1 is a view in front elevation of a hybrid motor system according to the invention.

Referring to FIG. 1 of the accompanying drawings, 1 is a first step motor which has a resolution of 2000 steps per revolution. Step motor 1 has its stator 2 bolted to a frame 3 and its output shaft 4 secured by a coupling 5 to the stator of a second step motor 7, having a resolution of 200 steps per revolution. The step motor 7 has an output shaft 8, extending through a bearing 9 located in the frame 3. As step motor 1 steps, it rotates the stator of step motor 7. As step motor 7 steps, it rotates the output haft 8. The latter then sums the motions of both step motors. The final accuracy of position is that of the step motor 1, but the speed of setting to that position is that of step motor 7.

Figure 2:
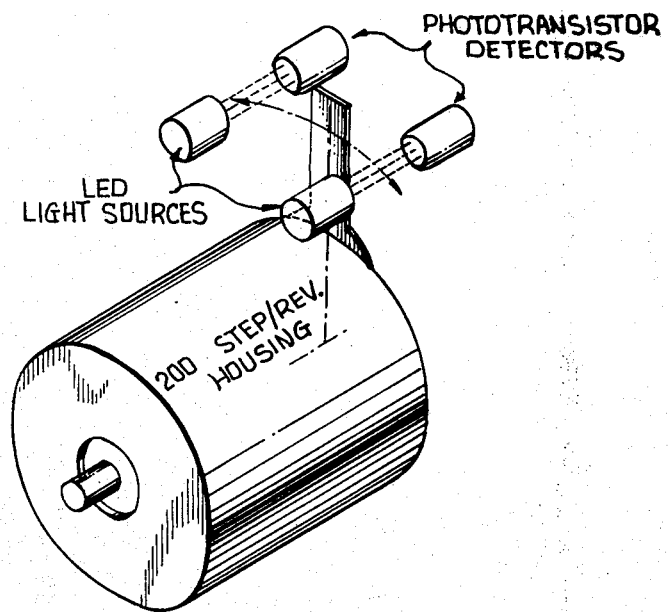
FIG. 2 is a view in perspective of photo-optical limiting means employed in logic control circuitry for the system of FIG. 1.

In FIG. 2 of the accompanying drawings is illustrated a shutter 7a mounted on the housing of the motor 7, and operating in conjunction with photo-optics consisting of two angularly displaced light emitting diodes 20, 45, each emitting light toward a photo-transistor detector 21, 46, respectively. The detectors are employed to prevent motor 1 achieving more steps than is required to divide the setting of the last step of the motor 1 by a factor of 10, assuming that motor 1 has 10 times the resolution of motor 7.

FIGS. 3A–3B may be joined to provide an elementary block diagram of the electronic system required to properly operate the two motors 1 and 7 comprising the hybrid system. The 200 step/rev. motor 10 with its associated logic driver is at the left side of the drawing and the 2000 step/rev. motor 11 is at the right-hand side.

Assume that the counters 12, 12a are both at zero. Under these conditions, the A=B outputs of both comparators 13, 14 are high enabling Nand gate 15, so that its output is low, thereby disabling pulse oscillator 16 and, through inverter 17, partially enabling the one-shot multivibrator 18.

Assume now that motor direction input 19 is high, calling for a clockwise (CW) motor rotation direction. Assume further that a BCD count is presented to the inputs of counters 12, 12a. If the 200 step/rev. motor housing (coupled to 2000 step/rev. motor 1 shaft) is at this time far enough CCW so that the light path from the LED 20 is interrupted by shutter 7a this causes photo-transistor 21 to stop conducting. The collector of transistor amplifier 22 consequently goes high in voltage partially enabling Nand gate 23. If a start-cycle trigger pulse is now applied to input 24, the one-shot 18 is fully enabled and its Q output goes low for a predetermined length of time, causing BCD count data then being presented to counters 12, 12a to be entered into counters by enabling preset line 25. Simultaneously Q of one-shot 18 goes high fully enabling Nand gate 23 so its output goes low.

The state of the motor direction line 19 is compared to the state of latch 26 output 27 by comparator 29. If they are the same, as in the present case, the A=B output of comparator 29 is high, partially enabling Nand gate 30 and disabling, via inverter 31, Nand gate 32 and Nand gate 33, which respectively feed the "count up" lines of counters 12a and 12.

When the Q output of one-shot 18 goes back to low, it triggers one-shot 34, so that the Q output of 34 goes high momentarily. The Q output of one-shot 34 feeds Nand gate 33, but, as Nand gate 33 is disabled by the output of inverter 31, the output of Nand gate 33 does not react, so no pulse is fed to the count up line of counter 12.

As long as there is a count other than zero in either counter 12 or 12a, at least one A=B line is low, disabling Nand gate 15 so that its output line is high, enabling pulse oscillator 16, so that pulses appear on drive pulse lines 35.

As long as there is a count in counter 12, A=B comparator 13 is low, the output of inverter 36 is high, and Nand gate 37 is enabled, feeding pulses from pulse line 35 to the count down line of counter 12. The output of Nand gate 37 also goes to an inverter 38, which feeds positive going pulses to both Nand gates 39 and 40. Only one of the Nand gates 39 or 40 (in this case gate 39) is enabled by motor direction line 19 as inverter 41 has disabled Nand gate 40, so pulses appear only on pulse line CW and cause the 200 step/rev. motor shaft to take one CW step for each count in counter 12. When counter 12 reaches zero, the A=B line of comparator 13 goes high, and the output of inverter 36 goes low, disabling Nand gate 37 so that no more of the oscillator 16 pulses are fed to counter 12 or 200 step/rev. motor 7.

Simultaneously, if there is a count other than zero preset into counter 12a, the A=B line of comparator 14 is low and the output of inverter 42 is high, partially enabling gates 30 and 32. Gate 32 has been disabled by the low output of inverter 31, whereby when positive-going pulses appear on the "drive pulse line" 35, they appear as negative-going pulses on the "count down" line of counter 12a.

The high output of inverter 42 is also fed to Nand gates 43 and 44 partially enabling them. Nand gate 44 is already disabled by the low output 28 from latch 26, whereby when positive-going pulses appear on the drive pulse line they enable Nand gate 43, whose output feeds negative-going pulses to the CW line of the 2000 step/rev. motor driver 1, causing the motor shaft to take one step CW for each drive pulse.

When the count in counter 12a reaches zero, line A=B of comparator 14 goes high, and the output of inverter 42 goes low disabling Nand gates 30 and 43, whereby neither the counter 12a nor the motor 11 receives further pulses. When the A=B lines of both comparators 13 and 14 are high Nand gate 15 is enabled, its output goes low, disabling the pulse oscillator 16 and re-enabling the one-shot 18, ready for another "start cycle" pulse. The reason for disabling the one-shot 18 during the period when the oscillator, and at least one motor, is running, is so the cycle of operations cannot be upset by an inadvertent pulse at start cycle input 24.

Assume that the 200 step/rev. motor housing has moved far enough CW that the emission from LED 45 is interrupted, turning off photo-transistor 46 and transistor amplifier 47, and partially enabling Nand gate 48. When the cycle has stopped and a pulse is again applied to start cycle input 24, the Q output of one-shot 18 goes high, enabling Nand gate 48, and resetting latch 26, whereby output 28 is high and 27 is low, calling for the 2000 step/rev. motor to operate in a CCW direction in contrast to the CW direction in which the 200 step/rev. motor will operate. When the "Q" output of one-shot 18 goes back low, one-shot 34 is triggered, producing a positive pulse at Q. This pulse enables Nand gate 33 because the other input of 33 is high, for the following reasons. The output of comparator 29 is low, because the motors 1 and 7 are to operate in opposite directions. The input of inverter 31 is low, Nand gate 30 is disabled, the output of inverter 31 is high and Nand gate 32 is partially enabled. The pulse from Q of one-shot 34 causes a count of one to be added to the count in counter 12 by enabling gate 33. Also, when the oscillator 16 starts, pulses are fed via gate 32 to the count up input of counter 12a and motor 1.

Thus, the fact that the motors are called on to operate in opposite directions because the limit of housing rotation of the 200 step/rev. motor has been reached causes the 200 step/rev. motor to take one added step, while the 2000 step/rev. motor 1 moves back the tens complement of the number of steps preset into counter 12a by operating the counter in the opposite or "up"

direction to overflow to "zero". Each step of the 200 step/rev. motor 7 equals 10 steps of the 2000 step/rev. motor 1. So, if we operate both motors CW one step we reach a given position, that is, +1.1 large motor steps from the starting position. If we operate the 200 step/rev. motor 7 two steps CW and the 2000 step/rev. motor 1 nine steps, CCW, we reach the same position +1.1 large motor steps.

The pulse rate control 50 is set to increase clock frequency of pulse oscillator 16 if the count requested by counter 12, at any instant, is higher than a given value. It is desired that if motor 7 must step through a large angle, it does so rapidly until the motor nears its final position as indicated by a low count in counter 12. To this end, a predetermined output lead of counter 12 is utilized to provide a disable pulse to the rate control or ramping control 50. The oscillator 16 has, then, two modes of ramping the rate up and down and a uniform low rate. This feature is optional. It decreases the total time required for an operation, but does not otherwise affect the logic of the system.

I claim:

1. A motor system, including a first step motor having a first housing and a first rotor which rotates relative to said first housing, a source of pulses, means connecting said source of pulses to said first step motor for effecting a step motion of said first rotor in either sense selectively in response to each of said pulses, a second step motor having a second housing and a second rotor which rotates relative to said second housing, logic means connecting said source of pulses to said second step motor for effecting a step motion of said second rotor in either sense selectively in response to each of said pulses, means coupling said first rotor to said second housing for rotation of said second housing in response to rotation of said first rotor, and logic means for controlling the number of pulses applied to each of said step motors from said source of pulses to achieve a total predetermined rotary motion of said second rotor, said second rotor having an output shaft for coupling to a load.

2. The combination according to claim 1, wherein said logic means drives each of said first and second rotors selectively in the same and in opposite senses of rotation independently of one another.

3. The combination according to claim 1, wherein said means for controlling said number of pulses applied to each of said step motors includes separate counters for counting said pulses to control the numbers of said pulses applied to said motors, respectively.

4. The combination according to claim 1, wherein said pulses are applied to both said step motors concurrently.

5. The combination according to claim 3, which further includes means for terminating pulsing of said source of pulses in response to said counters both achieving preset counts.

6. The combination according to claim 5, wherein said preset counts are zero counts.

7. The combination according to claim 6, wherein the relative angular rotations per step of said first rotor and said second rotor is one to ten for each of said pulses.

8. The combination according to claim 7, wherein said first rotor is directly connected to said second housing.

9. The combination according to claim 8, wherein said first motor is a 2000 step per revolution motor and wherein said second motor is a 200 step per revolution motor.

10. The combination according to claim 3, wherein either of said motors may step while the other motor is stationary.

11. Apparatus for indexing an output shaft to a desired predetermined angular position in response to a variable input signal representative of said angular position comprising:
   a. a first stepping motor having a rotor for rotating said shaft a step at a time relative to a first motor housing means in response to a first digital signal determined by said first variable input signal;
   b. a second stepping motor having a rotor operable a step at a time by a second digital signal also determined by said variable input signal, the angular rotation of said second motor from one step to the next being a predetermined sub-multiple of the angular rotation of said first stepping motor as it moves from one step to the next;
   c. and means responsive to rotation of the rotor of said second motor for rotating said housing means of said first stepping motor.

12. The apparatus of claim 11 which further includes a separate counter for each said stepping motor, means for entering into each said counter a count corresponding to the number of steps that the respective counter is to be stepped to reach its predetermined position, and means for reducing the count in each counter toward zero as the corresponding stepping motor is stepped.

13. The combination according to claim 11, wherein said stepping motors are each reversible.

14. The combination according to claim 11, wherein said rotary stepping motors are each reversible independently of the other.

15. Stepping motor apparatus comprising:
   a rotor operable one step at a time relative to an associated housing,
   mounting means for said housing to rotate said housing one step at a time,
   a first counter and a second counter,
   a source of pulses,
   first means responsive to said pulse source for actuating said rotor a plurality of steps and for concurrently operating said first counter,
   second means also responsive to said pulse source for actuating said housing a plurality of steps and for concurrently operating said second counter,
   said rotor and said housing respectively rotating through unequal angles as each is actuated by a single step.

* * * * *